US009140322B2

(12) United States Patent
Kobayashi et al.

(10) Patent No.: US 9,140,322 B2
(45) Date of Patent: Sep. 22, 2015

(54) DISC BRAKE PAD ASSEMBLY

(75) Inventors: Daisuke Kobayashi, Tokyo (JP); Yoshihiro Hirata, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 8 days.

(21) Appl. No.: 14/344,418

(22) PCT Filed: Sep. 13, 2012

(86) PCT No.: PCT/JP2012/073521
§ 371 (c)(1),
(2), (4) Date: Mar. 12, 2014

(87) PCT Pub. No.: WO2013/039174
PCT Pub. Date: Mar. 21, 2013

(65) Prior Publication Data
US 2014/0360822 A1 Dec. 11, 2014

(30) Foreign Application Priority Data
Sep. 13, 2011 (JP) .................. 2011-199675

(51) Int. Cl.
*F16D 65/097* (2006.01)
*F16D 65/095* (2006.01)
*F16D 65/00* (2006.01)

(52) U.S. Cl.
CPC ........ *F16D 65/0971* (2013.01); *F16D 65/0006* (2013.01); *F16D 65/095* (2013.01)

(58) Field of Classification Search
CPC . F16F 65/0971; F16F 65/0006; F16F 65/095; F16F 65/092; F16F 65/02; F16F 2065/785

USPC ........ 188/250 E, 250 B, 250 G, 73.37, 264 G
See application file for complete search history.

(56) References Cited

U.S. PATENT DOCUMENTS

| 4,995,482 | A | * | 2/1991 | Kobayashi et al. .......... 188/73.1 |
| 5,842,546 | A | * | 12/1998 | Biswas ..................... 188/73.37 |
| 5,975,252 | A | * | 11/1999 | Suzuki et al. ............... 188/73.1 |
| 2006/0157307 | A1 | | 7/2006 | Tsurumi et al. | |
| 2008/0087503 | A1 | | 4/2008 | Wake et al. | |

FOREIGN PATENT DOCUMENTS

| JP | S54-145789 U | 10/1979 |
| JP | H04-138137 U | 12/1992 |
| JP | 2000-205311 A | 7/2000 |

(Continued)

*Primary Examiner* — Xuan Lan Nguyen
(74) *Attorney, Agent, or Firm* — Drinker Biddle & Reath LLP

(57) ABSTRACT

A disc brake pad assembly includes a pair of locking bent portions formed at circumferential end portions of an inner shim plate by being bent towards an opposite side to a pressure plate. Locking through holes are formed individually at base end portions of the locking bent portions. A pair of locking projecting pieces are individually formed so as to project circumferentially from an outer main body portion included in an outer shim plate. A distance between distal edges of the locking projecting pieces is larger than a space between the locking bent portions, and a circumferential length defined between radial side portions of the locking projecting pieces is shorter than the space. The inner main body portion and the outer main body portion are superposed on each other in a state that the locking projecting pieces are brought into engagement with the locking through holes.

5 Claims, 15 Drawing Sheets

(56) References Cited

FOREIGN PATENT DOCUMENTS

| JP | 2005-042759 A | 2/2005 |
|---|---|---|
| JP | 2005-121174 A | 5/2005 |
| JP | 2006-200560 A | 8/2006 |
| JP | 2008-095832 A | 4/2008 |
| JP | 2009-030719 A | 2/2009 |

* cited by examiner

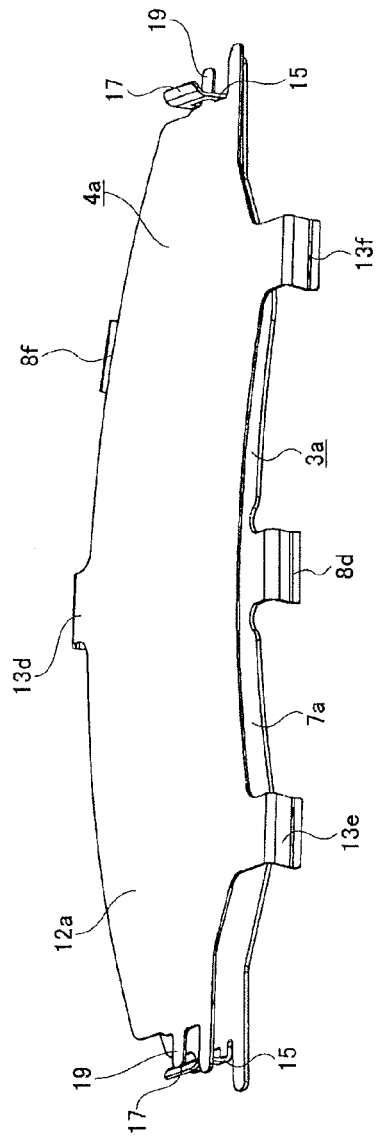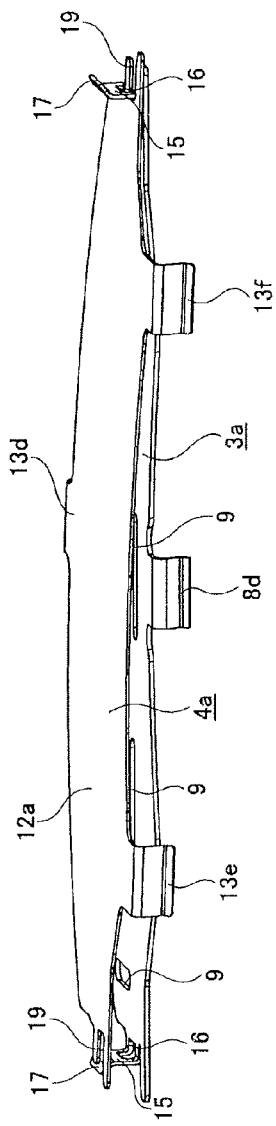
Fig. 7A
Fig. 7B

DISC BRAKE PAD ASSEMBLY

TECHNICAL FIELD

The present invention relates to an improved disc brake pad assembly.

BACKGROUND ART

In disc brakes used to brake a motor vehicle, a pair of pads are disposed so as to sandwich a rotor which rotates together with a wheel, and when the brakes are applied, both the pads are pressed against both axial side surfaces of the rotor. There are two types of basic constructions for such disc brakes: one is a construction with a floating caliper, and the other is a construction with an opposed-piston fixed caliper. In the case of either of the constructions, the rotor which rotates together with the wheel is strongly sandwiched from both axial sides thereof by the pair of pads when the brakes are applied. In both the pads, a lining is additionally attached to a front surface of a pressure plate which has sufficient rigidity. Then, when the brakes are applied, a back surface of the pressure plate is pressed, whereby a front surface of the lining is brought into frictional contact with both axial side surfaces of the rotor. When referred to in this description and the claims, axial direction, circumferential direction and radial direction mean an axial direction, circumferential direction and radial direction of a rotor, respectively, in such a state that a disc brake pad assembly is assembled to a disc brake unless otherwise described. In addition, a circumferential edge portion means an inward circumferential edge portion or an outward circumferential edge portion with respect to the radial direction of the rotor.

When the brakes are applied, an abutment portion where the axial side surfaces of the rotor and the front surfaces of the linings of the pads are brought into abutment with each other and which constitutes a portion where a frictional force is exerted is offset axially from an abutment portion where the pressure plates and supports or a caliper are brought into abutment with each other and which constitutes an anchor portion which bears brake torque which is exerted on both the pads by at least an amount equaling a total thickness of the linings of both the pads (the frictional portion is offset from the brake torque bearing portion). Then, a moment is exerted on both the pads in a direction in which a leading side of the rotor approaches (falls towards) both the pads based on the offset equaling the thickness of the linings, and this easily makes the orientations of both the pads unstable. In case the orientations of both the pads become unstable when the brakes are applied, it becomes difficult that both the pads behave smoothly, and these pads are caused to vibrate, whereby noise referred to as a "brake squeal" is easily generated or the degree of partial wear of the linings easily becomes remarkable.

In order to mitigate the brake noise or the partial wear described above, it is conventional and widely accepted practice to sandwich a shim plate between a back surface of a pressure plate which makes up a pad and a distal end face of a piston which constitutes a pressing surface which presses the back surface or an inner surface of a caliper claw portion. In a shim plate like this, although a single-plate configuration is adopted in which only a single shim plate is used, in order to improve the effect of suppressing the brake squeal or the partial wear, a double-plate configuration is also widely adopted in which an inner shim plate and an outer shim plate are fittingly superposed on each other. Additionally, a construction has also been known conventionally in which an inner and outer shim plates are assembled together so as to be displaced relative to each other in a circumferential direction while being prevented from being separated from each other in a thickness direction.

Patent Literature 1 describes a construction as shown in FIGS. 13 to 15 as a disc brake pad assembly which has the function described above. In the disc brake pad assembly of the conventional construction, a combined shim plate 5 which is made up of an inner shim plate 3 and an outer shim plate 4 is mounted on a back surface of a pressure plate 2 which makes up a pad 1. In the pad 1, a lining 6 is additionally attached and fixed to a front surface of the pressure plate 2 (which is a surface which faces a side surface of a rotor (not shown) when assembled to a disc brake) with a large fastening force so as not to be forced to deviate by brake torque exerted when the brakes are applied. The inner shim plate 3 is made of a metallic plate which is a stainless steel plate, a rubber-coated stainless steel plate or the like and includes a flat plate-shaped inner main body portion 7 and a plurality of inner locking pieces 8a, 8b, 8c. A front half portion of each of the inner locking pieces 8a, 8b, 8c has substantially an "L" shape in which an axial middle portion is bent towards a circumferential edge portion of the pressure plate 2a.

Additionally, a plurality of through holes 9, 9 are formed in the inner main body portion 7 so as to hold a grease therein. In addition, of radially inward and outward circumferential edge portions of the pressure plate 2, a locking recess portion 10 is formed in a circumferential central portion of the radially outward edge portion, and a pair of step portions 11, 11 are formed at portions of the radially inward edge portion which lie close to circumferential ends thereof. In the inner locking pieces 8a, 8b, 8c of the inner shim plate 3, the radially outward inner locking piece 8a is brought into engagement with the locking recess portion 10, while the radially inward inner locking pieces 8b, 8c are brought into engagement with the step portions 11, 11, whereby the pressure plate 2 is held from both radial sides thereof by the inner locking pieces 8a, 8b, 8c. In this state, the inner shim plate 3 is attached to a back surface side of the pressure plate 2 in such a state that circumferential and radial displacements thereof are restricted (actually prevented).

In addition, the outer shim plate 4 is made of a metallic plate which is a stainless steel plate or the like and includes a flat plate-shaped outer main body portion 12 and a plurality of outer locking pieces 13a, 13b, 13c. A front half portion of each of the outer locking pieces 13a, 13b, 13c also has substantially an "L" shape in which an axial middle portion is bent towards a circumferential edge portion of the pressure plate 2a. In the outer shim plate 4 described above, the outer main body portion 12 is fittingly superposed on the inner main body portion 7 with the outer locking pieces 13a, 13b, 13c fittingly superposed on the inner locking pieces 8a, 8b, 8b, respectively. As this occurs, projecting portions of inner surfaces (surfaces which face the circumferential edge portions of the pressure plate 2) of the front half portions of the outer locking pieces 13a, 13b, 13c are brought into elastic engagement with recess portions on outer surfaces (surfaces opposite to the circumferential edge portions of the pressure plate 2) of the front half portions of the inner locking pieces 8a, 8b, 8c, respectively. In this state, the outer shim plate 4 is assembled to the inner shim plate 3 so as to be displaced in a circumferential direction while being restrained from being separated from the inner shim plate 3 in the thickness direction. Because of this, a circumferential widthwise dimension of the outer locking piece 13a is made smaller than circumferential widthwise dimensions of the locking recess portion 10 and the inner locking piece 8a, and a space between circumferential outer edges or opposite side edges of the outer locking pieces 13b, 13c is made smaller than a space between the step portions 11, 11.

In the case of the conventional construction having the configuration described above, since the inner locking pieces 8a, 8b, 8c are fittingly superposed on the outer locking pieces 13a, 13b, 13c, respectively, the projecting amount of the outer locking pieces 13a, 13b, 13c from the circumferential edges of the pressure plate 2 is increased. As a result of this, the prevention of interference of the outer locking pieces 13a, 13b, 13c with other constituent members of the disc brake, for example, a caliper needs to taken into consideration. Although the installation space of the disc brake is limited, the constituent members including the caliper and the like are required to have a large magnitude of rigidity. Because of this, the fact that the prevention of the interference needs to be taken into consideration becomes disadvantageous from the viewpoint of ensuring the degree of freedom in designing the disc brake.

CITATION LIST

Patent Literature

Patent Literature 1: JP-A-2006-200560

SUMMARY OF INVENTION

Technical Problem

In view of the situations described above, an object of the invention is to provide a disc brake pad assembly in an inner and outer shim plates are assembled together so as not only to be displaced circumferentially relative to each but also to be prevented from being separated from each other inadvertently and which can suppress the projection of a pad from inward and outward circumferential edges of a pressure plate to a low level.

Solution to Problem

The above object of the invention is achieved by a disc brake pad assembly having the following configurations.
(1) A disc brake pad assembly comprises a pad, an inner shim plate and an outer shim plate.

The pad includes a lining additionally attached to a front surface of a pressure plate and is disposed at a portion facing an axial side surface of a rotor.

Additionally, the inner shim plate has a flat plate-shaped inner main body portion additionally provided on a back surface of the pressure plate included in the pad.

In addition, the outer shim plate has a flat plate-shaped outer main body portion superposed on the inner main body portion of the inner shim plate.

Further, the disc brake pad assembly comprises pairs of locking bent portions, locking through holes and locking projecting pieces.

The locking bent portions are formed at circumferential end portions of the inner shim plate so as to be bent to an opposite side to the pressure plate from the inner main body portion.

Additionally, the locking through holes are formed individually in widthwise central portions of base end portions of the locking bent portions.

In addition, the locking projecting pieces are formed individually so as to project circumferentially from radial middle portions of circumferential end edges of the outer main body portion included in the outer shim plate.

Additionally, a distance between distal edges of the locking projecting pieces is larger than a space between the locking bent portions.

In addition, a circumferential length defined between radial side portions of the locking projecting pieces on the circumferential end edges of the outer main body portion is shorter than the space between the locking bent portions.

Then, the inner main body portion and the outer main body portion are superposed on each other in a state that the locking projecting pieces are brought into engagement with the locking through holes.
(2) The disc brake pad assembly 14 configured as described under (1) above, wherein a guide inclined portion is formed at a portion of at least one of the locking bent portions which lies close to a distal end of the locking bent portions, the guide inclined portion being inclined in a direction in which the guide inclined portion is separated away from the other locking bent portion as the guide inclined portion extends towards a distal edge thereof.

Then, dimensions of the constituent portions are controlled so that, in a state that the outer main body portion is placed close to the inner main body portion while one of the locking projecting pieces is brought into engagement with one of the locking through holes at one of circumferential end edges of the outer main body portion of the outer shim plate, a distal edge of the other of the locking projecting pieces is brought into abutment with the guide inclined portion.
(3) The disc brake pad assembly configured as described under (1) or (2) above, wherein inner locking pieces are formed at three or more locations which are distributed to both circumferential edges (not on either of circumferential edges only) of an inward circumferential edge and an outward circumferential edge of the inner main body portion of the inner shim plate so as to be bent towards the pressure plate. Then, the inner shim plate is additionally provided on a back surface of the pressure plate in such a state that the inner shim plate is restricted from being displaced radially and circumferentially by the inner locking pieces being brought into elastic abutment with both inward and outward circumferential edges of the pressure plate.

Additionally, outer locking pieces are formed at three or more locations which are distributed to both circumferential edges of an inward circumferential edge and an outward circumferential edge of the outer main body portion of the outer shim plate so as to be bent towards the pressure plate. Then, the outer shim plate is fittingly superposed on a back surface of the inner shim plate in such a state that the outer shim plate is restricted from being displaced radially but is permitted to be displaced circumferentially by the outer locking pieces being brought into abutment with portions on both the inward and outward circumferential edges of the pressure plate which are displaced circumferentially from the portions where the inner locking pieces are provided.
(4) The disc brake pad assembly configured as described under (3) above, projecting portions are formed at portions on the circumferential edge portions of the pressure plate which are brought into abutment with one surface of each of the outer locking pieces, a circumferential central portion of a portion of each of the projecting portions which faces the one surface projects further radially than circumferential end portions thereof. Then, the circumferential edge portions of the pressure plate and the one surface of each of the outer locking pieces are spaced apart from each other at portions of the one surface which lie close to circumferential ends thereof.

(5) The disc brake pad assembly configured as described under (4) above, wherein a locking recess portion is formed in a circumferential edge portion of the pressure plate, the locking recess portion being concave further radially than both side portions which lie adjacent circumferentially thereto and having a circumferential widthwise dimension which is larger than a circumferential widthwise dimension of the outer locking pieces. Then, the projecting portion is formed at a portion on the circumferential edge portion of the pressure plate which corresponds to a bottom portion of the locking recess portion.

According to the disc brake pad assembly configured as described under (1) above, the construction can be realized in which both the inner and outer shim plates are assembled together in such a manner as not only to be displaced circumferentially relative to each other but also not to be separated inadvertently and moreover in which the projection of the pad from both the inward and outward circumferential edges of the pressure plate is suppressed to a low level. Namely, in the case of the disc brake pad assembly configured as described under (1) above, the separation of the inner and outer shim plates is prevented by the engagement between the locking through holes and the locking projecting pieces which are provided in and at the circumferential end portions of both the shim plates. Consequently, although the inner locking pieces provided on the inner shim plate are fittingly superposed on the outer locking pieces provided on the outer shim plate in the conventional construction shown in FIGS. 13 to 15, the inner locking pieces and the outer locking pieces do not have to be fittingly superposed on each other. As in the disc brake pad assembly configured as described under (3) above, even when the inner and outer locking pieces which are formed on both the inner and outer shim plates are locked on both the inward and outward circumferential edges of the pressure plate so as to retain both the shim plates on the pressure plate, the locking pieces are in engagement with the corresponding portions on the inward and outward circumferential edges without being superposed one on the other, whereby the projection of the locking pieces can be suppressed to a low level. Additionally, the assembling work of assembling both the shim plates together can be facilitated by adopting the configuration described under (2) above.

In addition to the function and advantage which are obtained by the disc brake pad assembly configured as described under (3) above, a construction can be realized at low costs by adopting the configuration described under (4) above in which a smooth circumferential displacement of the outer locking pieces relative to the circumferential edge portions of the pressure plate can be executed.

Namely, since the circumferential edge portions and the one surface of each of the outer locking pieces are spaced apart from each other at the portions which lie close to the circumferential ends of the one surface based on the presence of the projecting portions formed on the circumferential edge portions of the pressure plate, the end edges of the one surface which have the sharp shape (the radius of curvature of its cross section is almost 0) are never brought into frictional contact with the circumferential edge portions of the pressure plate. Because of this, the circumferential end edges of the outer locking pieces are prevented from biting into the circumferential edge portions, which enables a smooth circumferential displacement of the shim plate relative to the pressure plate.

When carrying out the disc brake pad assembly configured as described under (4) above, in case the configuration described under (5) above is adopted, the projection of the outer locking piece from the circumferential edge of the pressure plate is suppressed to a lower level at the portion where the locking recess portion is formed.

BRIEF DESCRIPTION OF DRAWINGS

FIGS. 7A and 7B are perspective views showing a state resulting in the middle of the inner and outer shim plates of the disc brake pad assembly shown in FIG. 1 being assembled together as seen from two different directions on the back surface side and the radially inward side.

DESCRIPTION OF EMBODIMENTS

Figure 1:
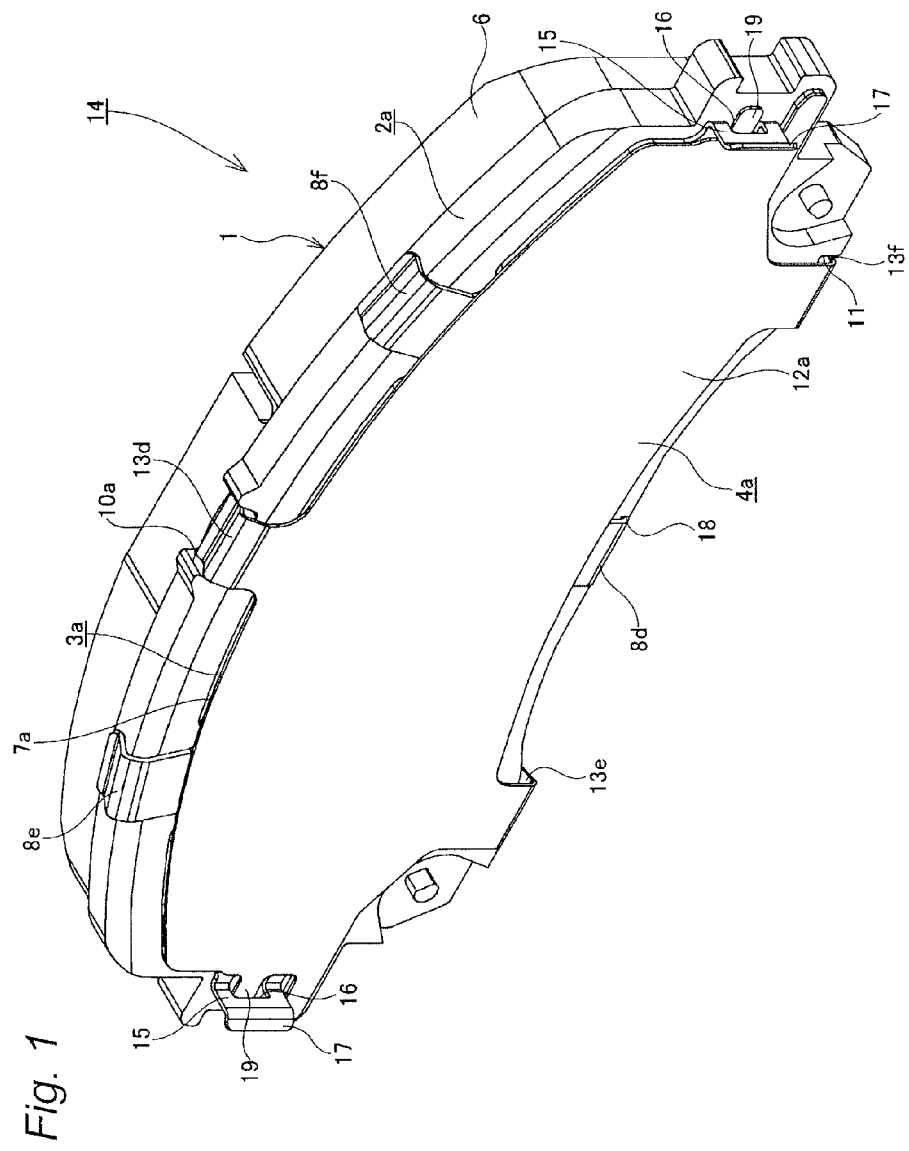
FIG. 1 is a perspective view showing an embodiment of a disc brake pad assembly according to the invention, which is a view as seen from a radially outward side on a back surface side of a pad.
Figure 2:
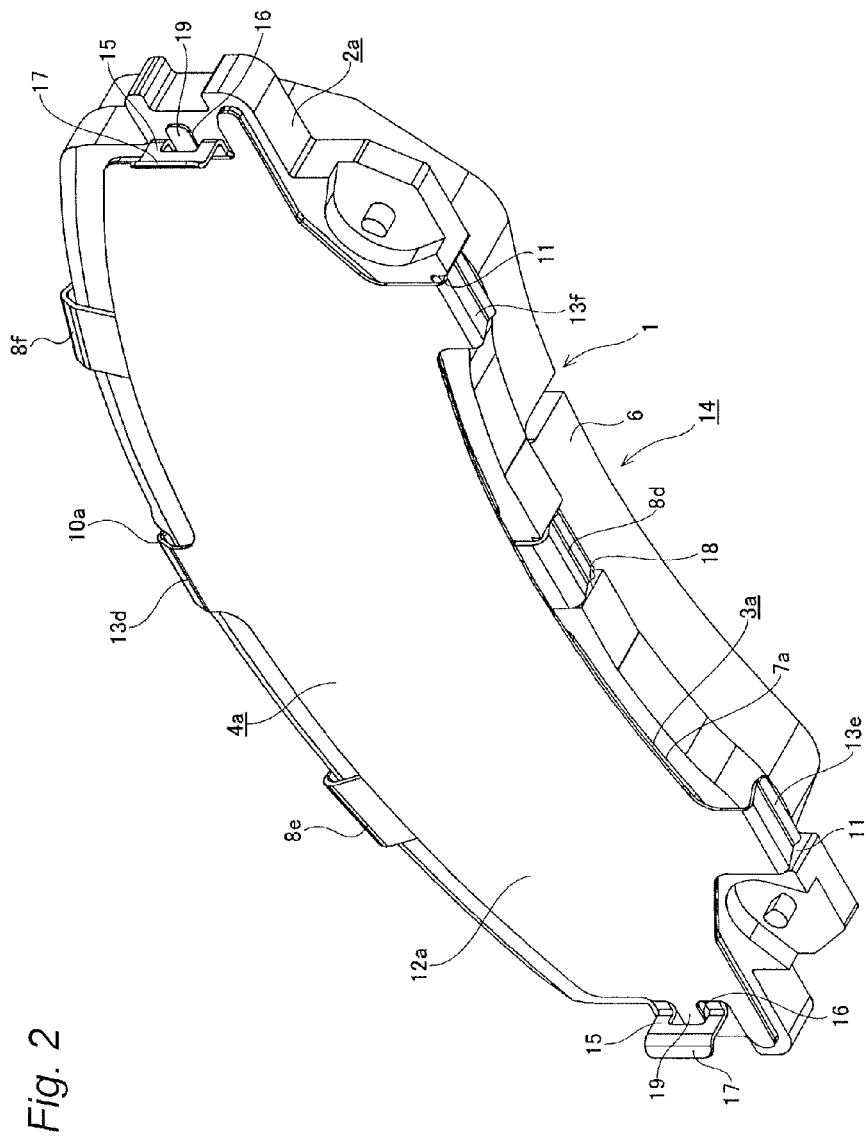
FIG. 2 is a perspective view of the disc brake pad assembly shown in FIG. 1 as seen from a radially inward side thereof.
Figure 3:
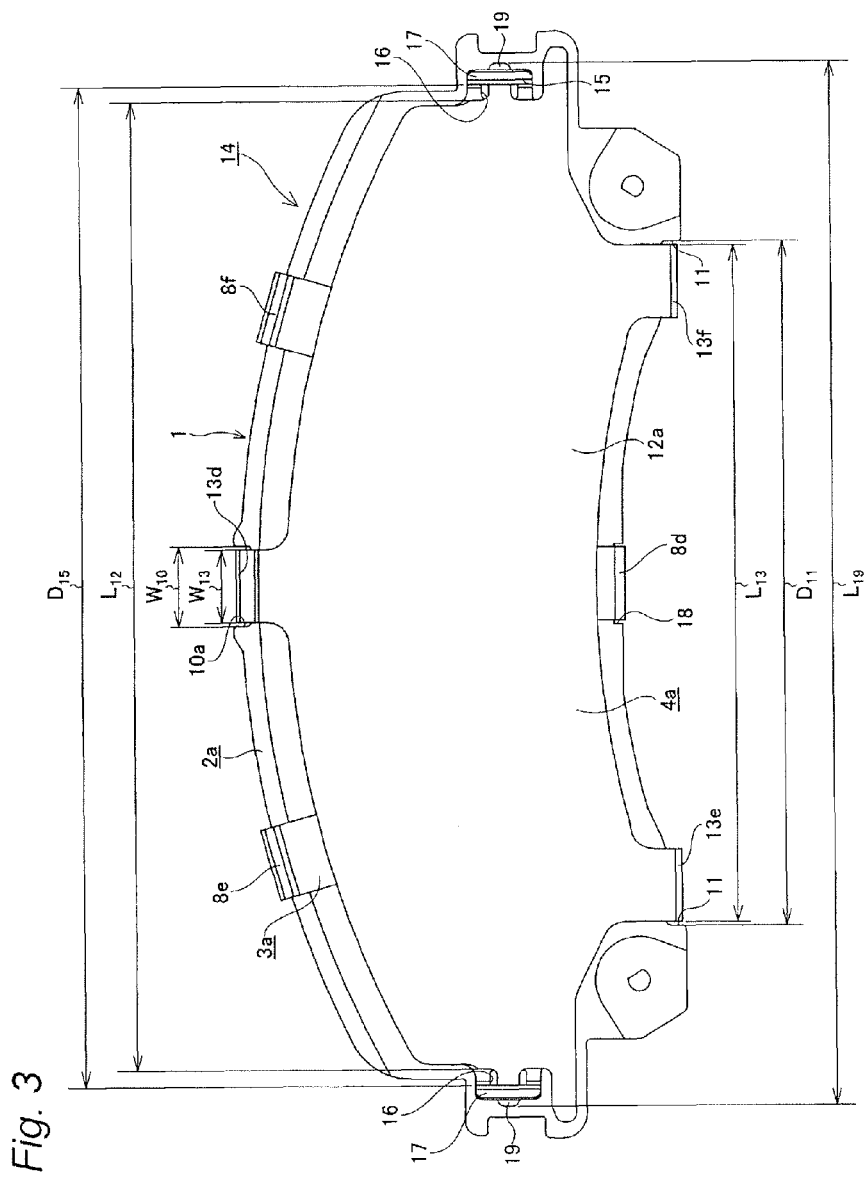
FIG. 3 is a projection drawing of the disc brake pad assembly shown in FIG. 1 as seen from a back surface side thereof.
Figure 4:
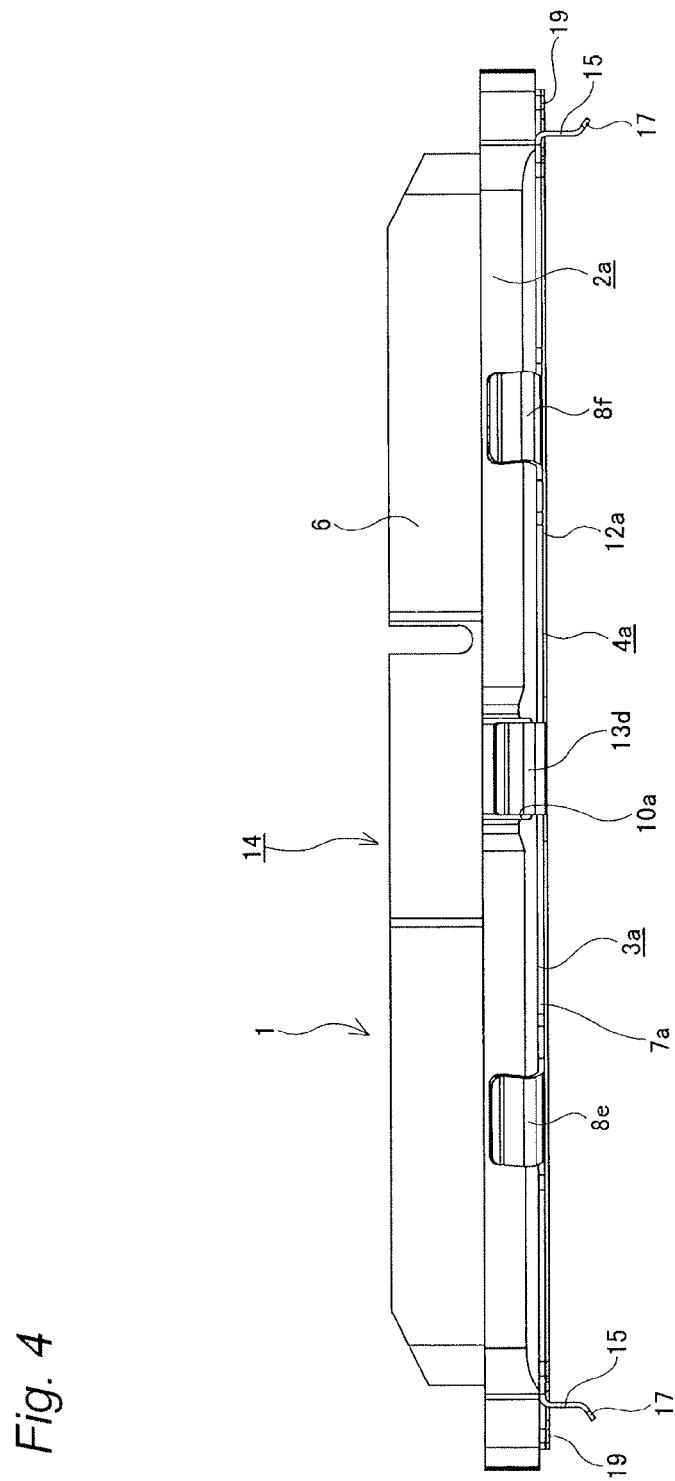
FIG. 4 is a projection drawing of the disc brake pad assembly shown in FIG. 1 as seen from the radially outward side thereof.
Figure 5:
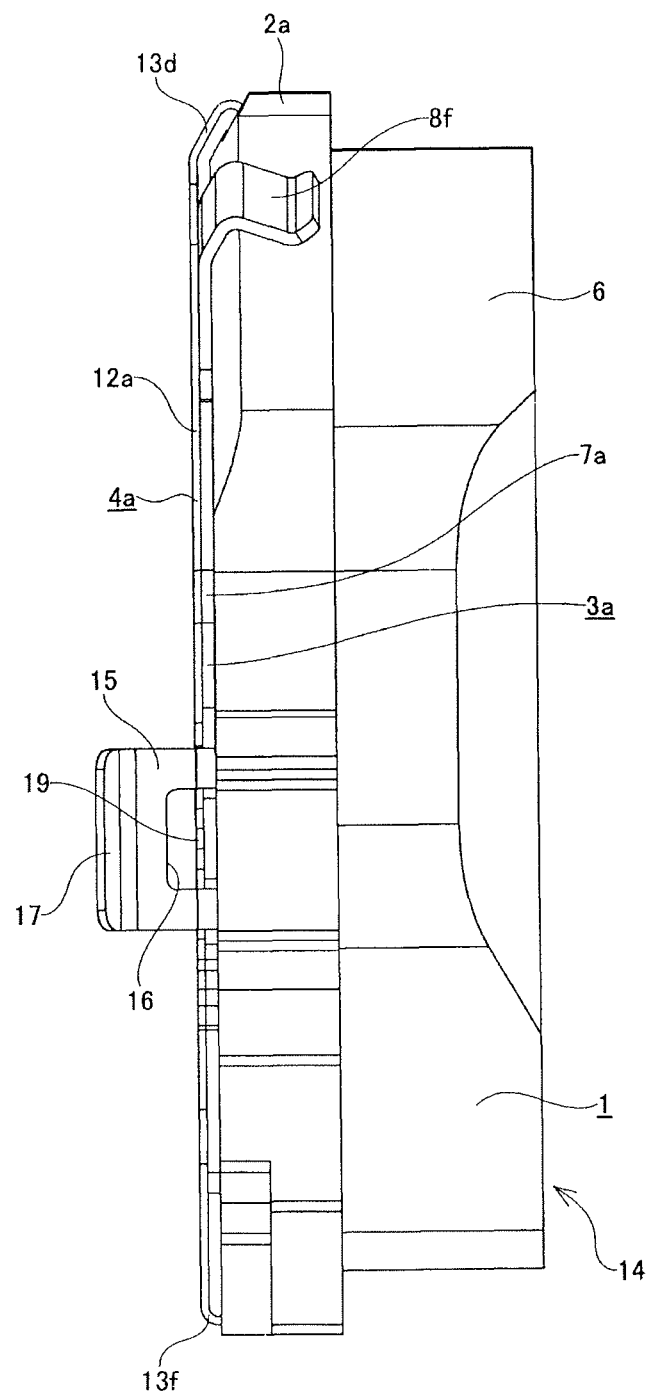
FIG. 5 is a projection drawing of the disc brake pad assembly shown in FIG. 1 as seen from a left-hand side of FIG. 3.
Figure 6:
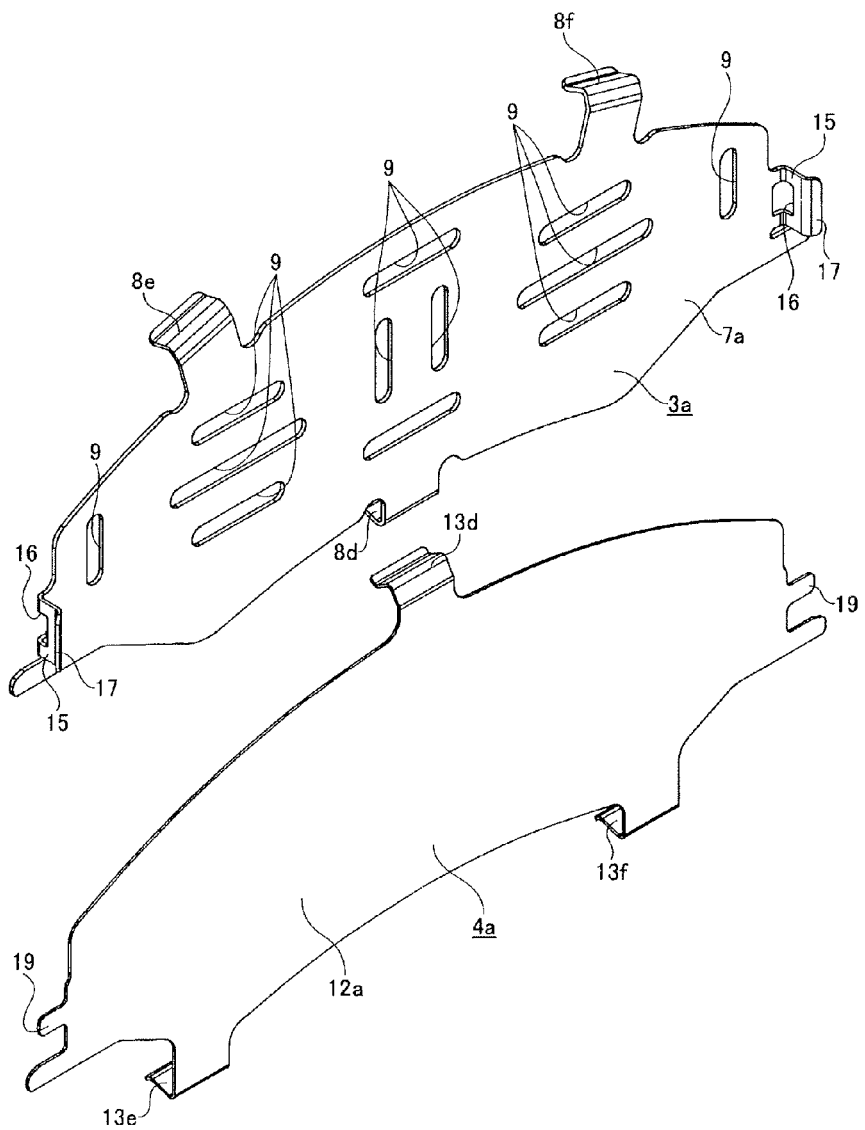
FIG. 6 is a perspective view showing a state resulting before inner and outer shim plates of the disc brake pad assembly shown in FIG. 1 are assembled together as seen from the radially outward side on the back surface side of the pad.
Figure 8:
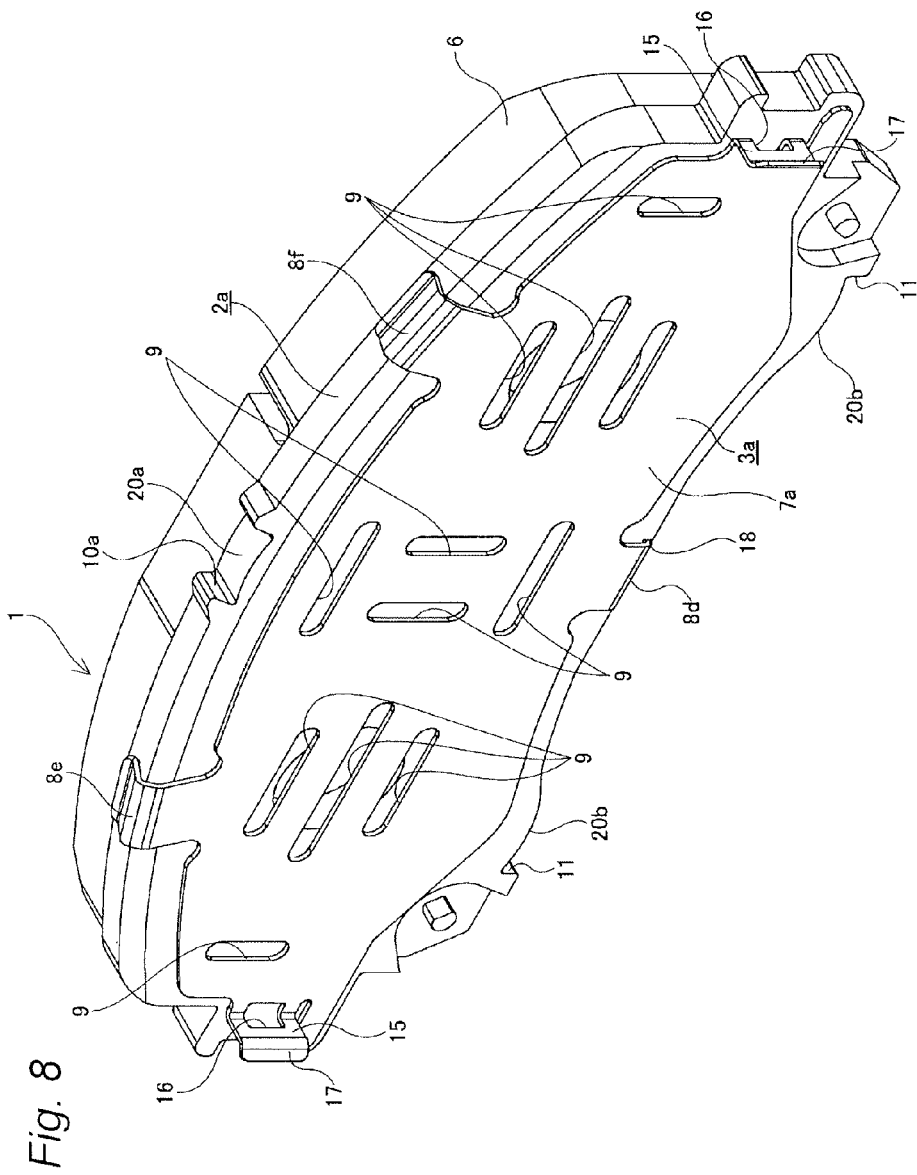
FIG. 8 is a perspective view showing a state in which only the inner shim plate is additionally provided on the back surface side of the pad of the disc brake pad assembly shown in FIG. 1 as seen from the radially outward side on the back surface side.
Figure 9:
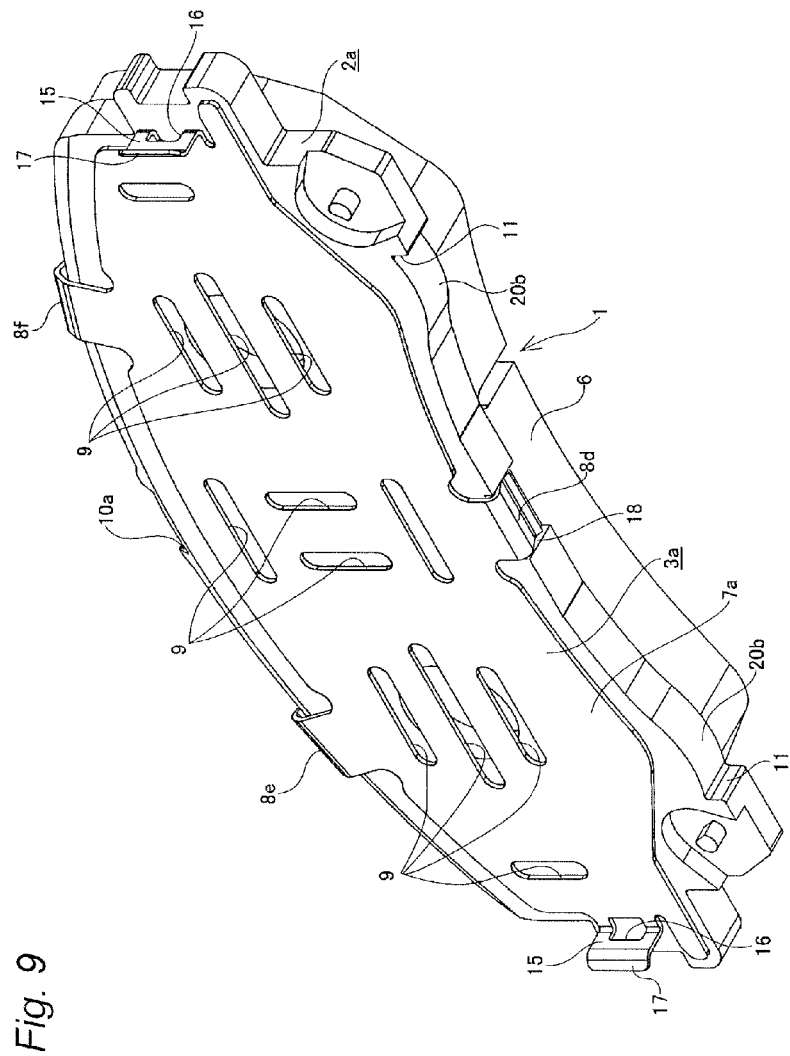
FIG. 9 is a perspective view showing a similar state to that shown in FIG. 8 as seen from the radially inward side on the back surface side.
Figure 10:
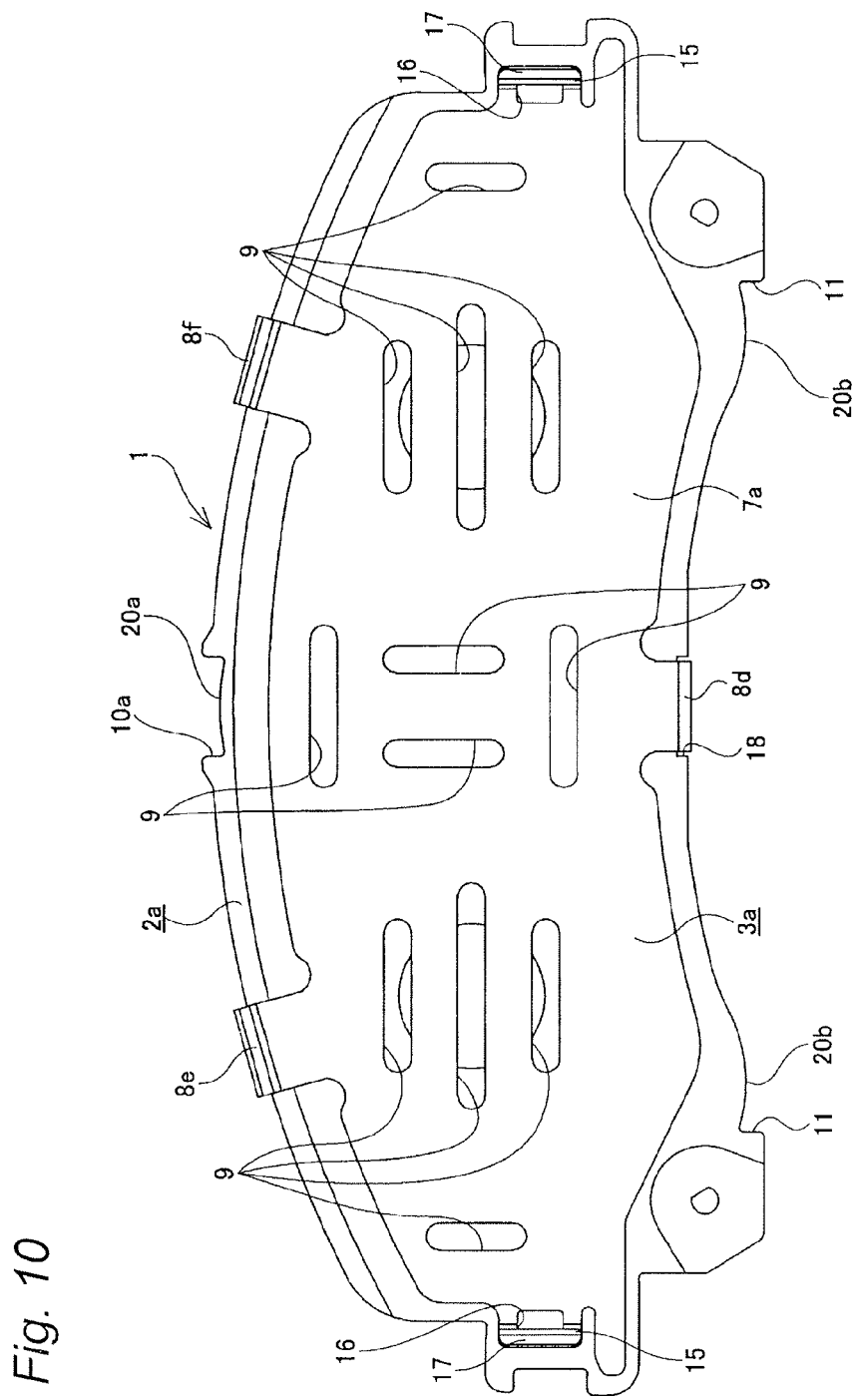
FIG. 10 is a projection drawing showing a similar state to that shown in FIG. 8 as seen from the back surface side.
Figure 11:
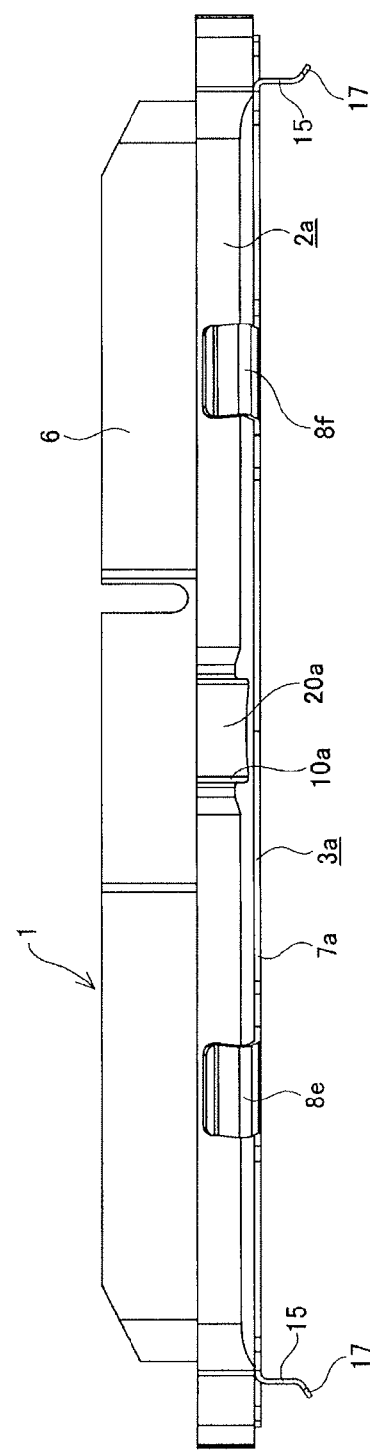
FIG. 11 is a projection drawing showing a similar state to that shown in FIG. 8 as seen from the radially outward side.
Figure 12:
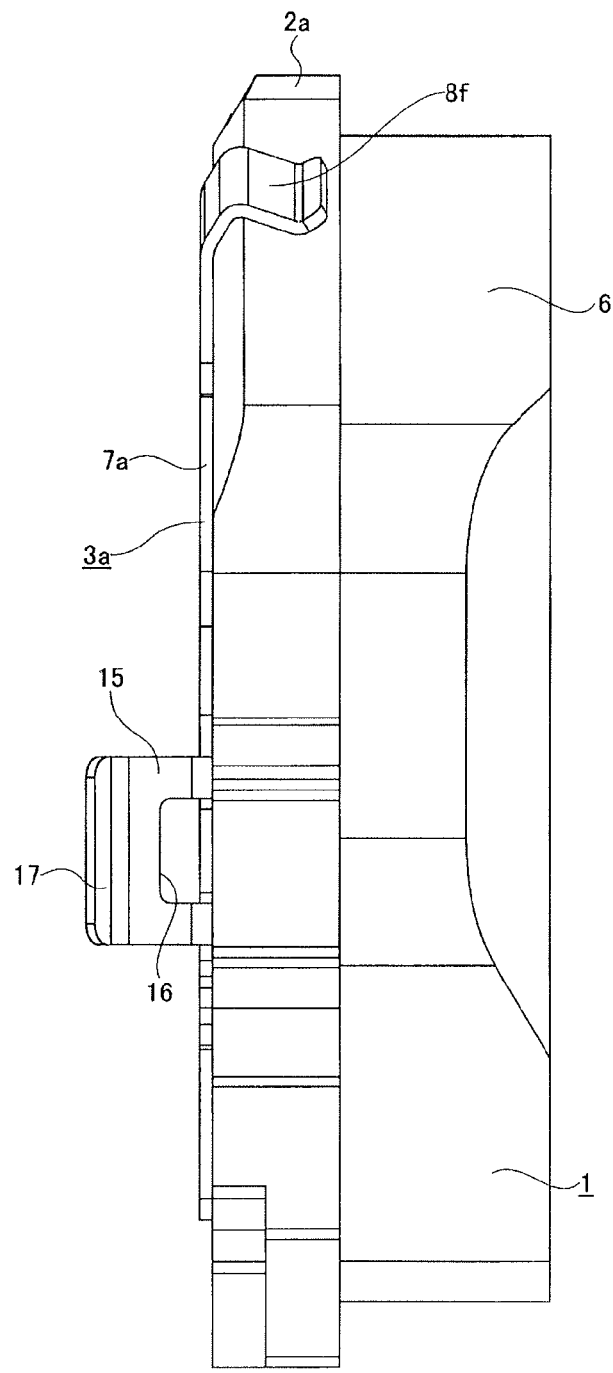
FIG. 12 is a projection drawing showing a similar state to that shown in FIG. 8 as seen from a left-hand side of FIG. 10.

FIGS. 1 to 12 show an embodiment of a disc brake pad assembly according to the invention which corresponds to the configurations described under (1) to (5) above. A disc brake pad assembly 14 according to the embodiment includes a pad 1, an inner shim plate 3a, and an outer shim plate 4a.

The pad 1 has a lining 6 which is additionally fixed to a front surface of a pressure plate 2 and is disposed at a portion which faces an axial side surface of a rotor, not shown. A locking recess portion 10a is formed in a circumferential central portion of a radially outward circumferential edge portion of the pressure plate 2a, and a pair of step portions 11, 11 are formed at portions which lie close to both circumferential ends of a radially inward edge portion.

Additionally, the inner shim plate 3a is fabricated by press stamping and bending a corrosion-resistant and elastic metallic plate including a stainless spring steel plate, a stainless spring steel plate in which rubber is coated on a surface which faces a back surface of the pressure plate 2a and the like. The inner shim plate 3a includes a flat plate-shaped inner main body portion 7a and a pair of locking bent portions 15, 15 which are bent to rise at almost right angles from both circumferential end portions of the inner main body portion 7a to an opposite side to the pressure plate 2a. Locking through holes 16, 16 are formed individually in widthwise (radial) central portions of the locking bent portions 15, 15 which extend from base end portions (portions which lie on the same flat plane as the inner main body portion 7a) to middle portions (portions which are bent at right angles with respect to the inner main body portion 7a) of the locking bent portions 15, 15. Additionally, guide inclined portions 17, 17 are formed individually at portions of the locking bent portions 15, 15 which lie close to distal ends thereof. Inclined directions of the guide inclined portions 17, 17 are such that a space defined between the guide inclined portions 17, 17 is expanded as they extend towards distal end edges thereof. Additionally, through holes 9, 9 which hold lubrication grease in interior portions thereof are formed at a plurality of locations on the inner main body portion 7a.

Further, inner locking pieces 8d, 8e, 8f which are bent individually towards the pressure plate 2a are formed at a total of three locations on inward and outward circumferential edges of the inner main body portion 7a of one circumferential central location on the inward circumferential edge and two locations which lie close to circumferential ends of the outward circumferential edge. Respective front half portions of the inner locking pieces 8d, 8e, 8f are bent to such an extent that an angle formed between the inner main body portion 7a and themselves constitutes an acute angle, and the front half portions thereof are allowed to be additionally attached to the back surface side of the pressure plate 2a while being elastically deformed in directions in which a radial space defined therebetween is expanded. In the case of this embodiment, a radially inward locking recess portion 18 with which the inner locking piece 8d which is formed at the circumferential central portion of the inward circumferential edge of the inner main body portion 7a can be brought into engagement is formed in a circumferential central portion of the inward circumferential edge portion of the pressure plate 2a. In the inner shim plate 3a, the inner main body portion 7a is brought into abutment with the back surface of the pressure plate 2a in such a state that an inner surface of the front half portion of the inner locking piece 8d is brought into elastic abutment with the inward circumferential edge portion of the pressure plate 2a at the portion where the radially inward locking recess portion 18 is formed, and inner surfaces of the front half portions of the inner locking pieces 8e, 8f are brought into elastic abutment with the outward circumferential edge portion of the pressure plate 2a in two positions which lie close to the circumferential ends thereof. In this state, the inner shim plate 3a is additionally attached to the back surface of the pressure plate 2a in such a state that its radial and circumferential displacements are restricted based on a frictional force which is exerted between the back surface of the pressure plate 2a and the inner shim plate 3a and a (non-linear) engagement between the inner locking pieces 8e, 8f and the outward circumferential edge portion of the pressure plate 2a.

In addition, the outer shim plate 4a is fabricated by press stamping and bending a corrosion-resistant and elastic metallic plate including a stainless spring steel plate and the like. The outer shim plate 4a includes a flat plate-shaped outer main body portion 12a and three outer locking pieces 13d, 13e, 13f. In these outer locking pieces 13d, 13e, 13f, the outer locking piece 13d which is provided at an outward circumferential edge side of the outer main body portion 12a is provided at a circumferential central portion, and the two outer locking pieces 13e, 13f which are provided at an inward circumferential edge side of the outer main body portion 12a are provided at portions which lie close to circumferential ends thereof. In the outer locking pieces 13d, 13e, 13f, as with the inner locking pieces 18d, 18e, 18f, respective half portions thereof are bent to such an extent that an angle formed between the outer main body portion 12a and themselves constitutes an acute angle, and the outer shim plate 4a can be additionally attached to the back surface side of the pressure plate 2a via the inner shim plate 3a. The outer locking pieces 13d, 13e, 13f should be such that they can be displaced circumferentially while positioning the outer shim plate 4a radially with respect to the pressure plate 2a, and hence, the outer locking pieces do not necessarily have to be brought into elastic abutment with the circumferential edges of the pressure plate 2a.

In the case of this embodiment, the locking recess portion 10 is formed in the circumferential central portion of the outward circumferential edge portion of the pressure plate 2a so as to permit a slight circumferential displacement of the outer locking piece 13d which is formed at the circumferential central portion of the outward edge of the outer main body portion 12a. Because of this, a circumferential width $W_{10}$ of the locking recess portion 10a is made slightly larger than a circumferential width $w_{13}$ of the outer locking piece 13d ($W_{10} > w_{13}$). Additionally, a space $D_{11}$ defined between the step portions 11, 11 is made slightly larger than a distance $L_{13}$ defined between opposite end edges of the pair of outer locking pieces 13e, 13f on the inward circumferential edge side ($D_{11} > L_{13}$).

Further, locking projecting pieces 19, 19 are formed individually at radial central portions of circumferential end edges of the outer main body portion 12a so as to project further circumferentially than portions of the end edges which lie radially adjacent thereto. A distance $L_{19}$ defined between distal edges of the locking projecting pieces 19, 19 is larger than a space $D_{15}$ defined between the locking bent portions 15, 15 which are formed at the circumferential end portions of the inner shim plate 3a ($L_{19} > D_{15}$). However, the dimensions $L_{19}$, $D_{15}$ are restricted as follows in relation to the guide inclined portions 17, 17. Namely, the respective dimensions of the constituent portions are restricted so that in such a state that as shown in FIGS. 7A and 7B, the outer main body portion 12a is placed close to the inner main body portion 7a of the inner shim plate 3a while the locking projecting piece 19 (the right-hand one in FIGS. 7A and 7B) which is either of the locking projecting pieces is brought into engagement with the locking through hole 16 (the right-hand one in FIGS. 7A and 7B) which is either of the locking through holes at the circumferential end edge (the right-hand one in FIGS. 7A and 7B) which is either of the circumferential end edges of the outer main body portion 12a, the distal edge of the other (the left-hand side in FIGS. 7A and 7B) locking projecting piece 19 is brought into abutment with the guide inclined portion 17 which is formed at the distal end portion of the other (the left-hand side in FIGS. 7A and 7B) locking bent portion 15 as shown in FIGS. 7A and 7B. Additionally, a circumferential length $L_{12}$ of a portion of the outer main body portion 12a which resides between the locking bent portions 15, 15, excluding the locking projecting pieces 19, 19 is made slightly smaller than the space $D_{15}$ ($L_{12}<D_{15}$).

In the outer shim plate 4a, the outer main body portion 12a thereof is fittingly superposed on the back surface of the pressure plate 12a via the inner main body portion 7a. The operation of fittingly superposing both the main body portions 12a, 7a on each other is executed easily by the main body portions 12a, 7a being pressed against each other in a thickness direction from the state shown in FIGS. 7A and 7B. Namely, when the main body portions 12a, 7a are pressed together in the thickness direction from the state shown in FIGS. 7A and 7B so that the main body portions 12a, 7a approach each other, in association with a frictional contact between the distal edges of the other locking projecting piece 19 and the guide inclined portion 17 at the distal end portion of the other locking bent portion 15, the other locking bent portion 15 is elastically deformed in a direction in which the other locking bent portion 15 is separated away from the locking bent portion 15 which is either of the locking bent portions to thereby permit the passage (an axial displacement) of the distal edge of the other locking projecting piece 19. Then, after the passage, the locking projecting portions 19, 19 are brought into engagement with the locking through holes 16, 16. In this state, the inner shim plate 3a and the outer shim plate 4a are assembled together so as to be displaced slightly circumferentially relative to each other. In addition, by the shim plates 3a, 4a being locked on the pressure plate 2a by the locking pieces 8d, 8e, 8f, 13d, 13e, 13f, the inner shim plate 3a is additionally attached to the pressure plate 2a in such a state that the inner shim plate 3a is positioned properly in radial and circumferential directions, whereas the outer shim plate 4a is additionally attached to the pressure plate 2a in such a state that the outer shim plate 4a is positioned properly in the radial direction while being allowed to be displaced slightly circumferentially. The shim plates 3a, 4a may be assembled together in advance, so that the shim plates are assembled to the pressure plate 2a thereafter. Alternatively, the inner shim plate 3a and the outer shim plate 4a may be assembled sequentially to the pressure plate 2a.

Although the circumferential displacement of the outer shim plate 4a relative to the pressure plate 2a is permitted based on a difference between the dimensions of the constituent portions (a minimum value of "$W_{10}$-$w_{13}$," "$D_{15}$-$L_{12}$," and "$D_{11}$-$L_{13}$"), the inner surfaces of the front half portions of the three outer locking pieces 13d, 13e, 13f which are provided on the outer shim plate 4a are brought into frictional contact with the circumferential edge portions of the pressure plate 2a during the circumferential displacement. In the case of this embodiment, the shapes of the constituent portions are devised so as to execute the circumferential displacement smoothly by suppressing the resistance based on the frictional contact to a low lever while suppressing the fabrication costs to a low level. Specifically, the inner surfaces of the front half portions of the outer locking pieces 13d, 13e, 13f are formed into linear shapes which are parallel to each other with respect to the circumferential direction, and partially cylindrical projecting portions 20a, 20b are formed at portions of the circumferential edge portions of the pressure plate 2a which are brought into frictional contact with the inner surfaces of the front half portions.

Consequently, the inner surfaces of the front half portions of the outer locking pieces 13d, 13e, 13f are brought into abutment with apex portions (portions which project most in the radial direction) of the projecting portions 20a, 20b in such a state that the outer shim plate 4a is positioned circumferentially in a neutral position relative to the pressure plate 2a. Then, in this state, circumferential side edges of the front half portions of the outer locking pieces 13d, 13e, 13f are spaced apart from the circumferential edge portions of the pressure plate 2a. In other words, the circumferential end edges of the inner surfaces of the front half portions of the outer locking pieces 13d, 13e, 13f which constitute sharp end edges are not brought into abutment with the circumferential edges of the pressure plate 2a.

Figure 13:
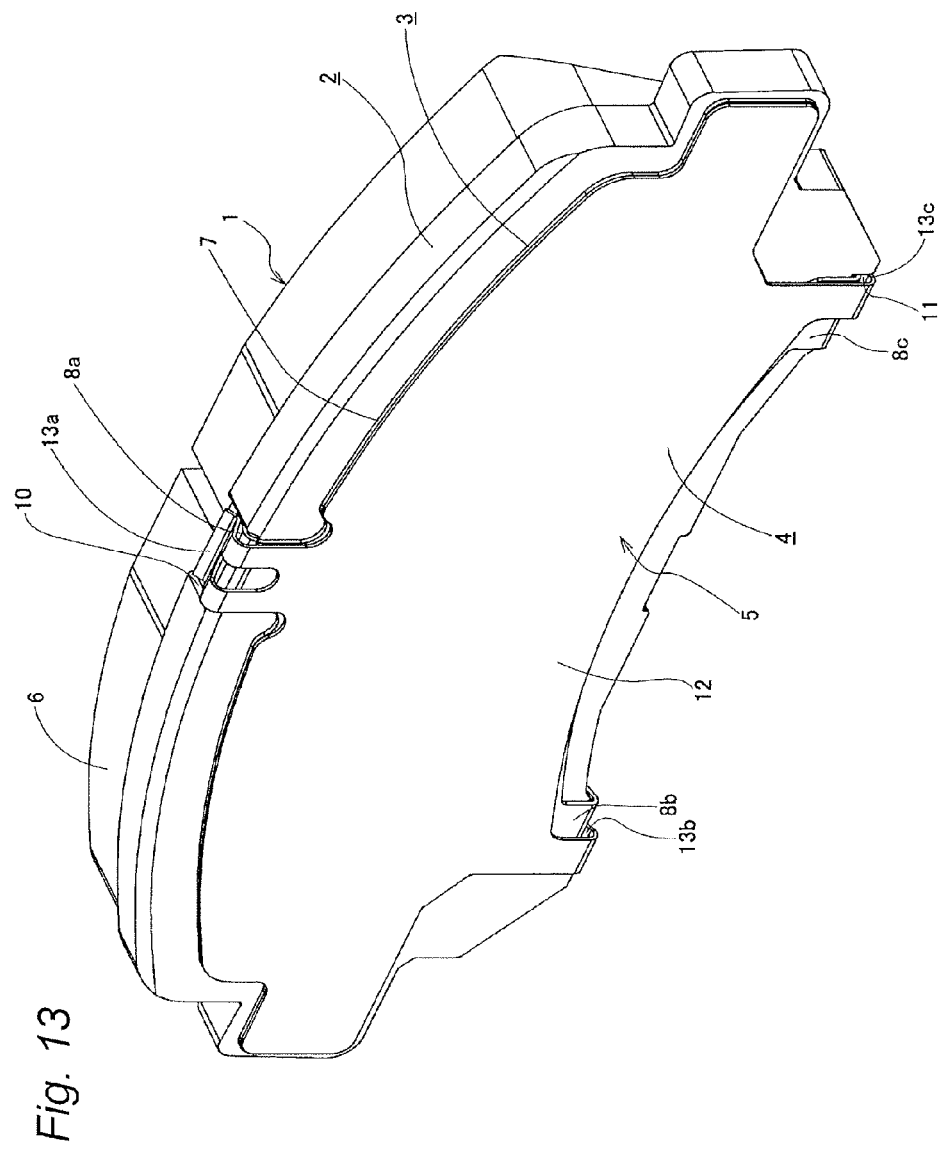
FIG. 13 is a perspective view showing an embodiment of a disc brake pad assembly according to a conventional construction as seen from a radially outward side on a back surface side of a pad.
Figure 14:
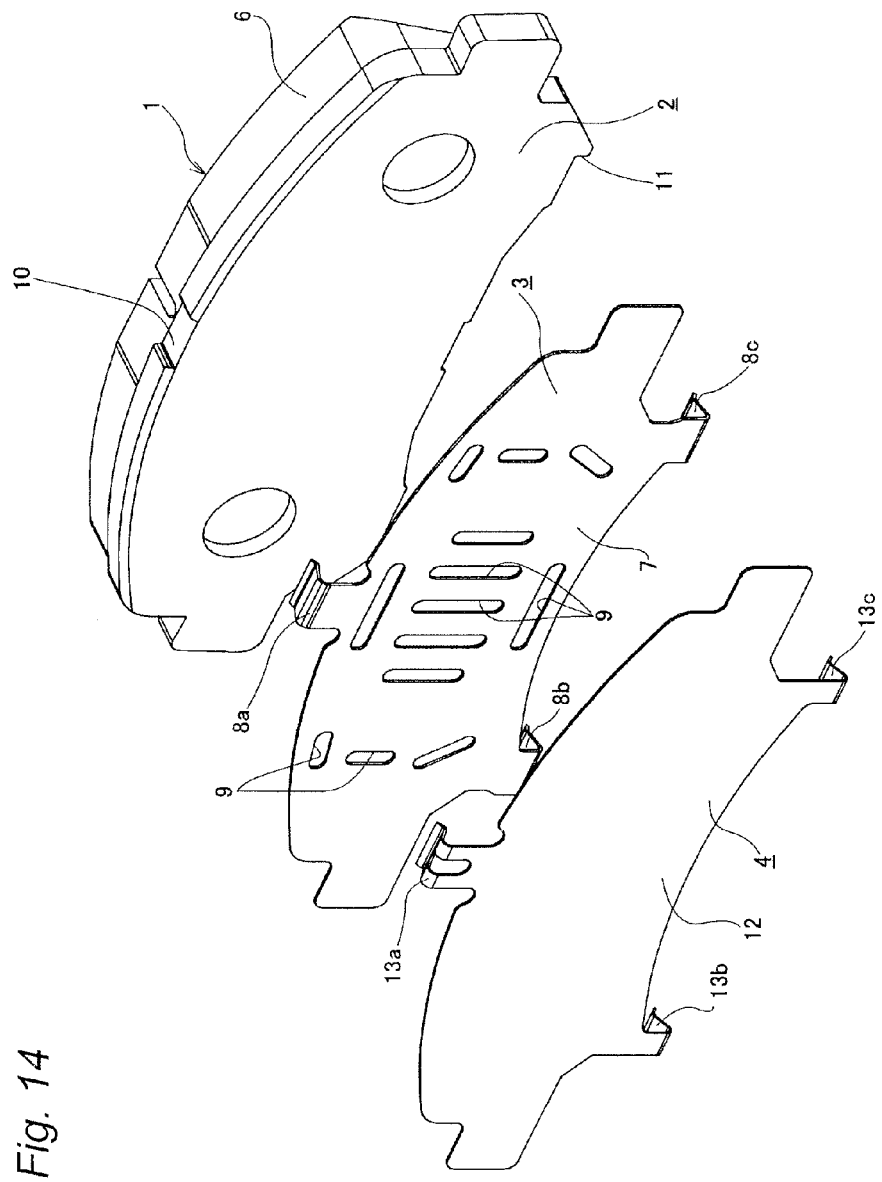
FIG. 14 is a perspective view showing a state resulting before the disc brake pad assembly shown in FIG. 13 is assembled.
Figure 15:
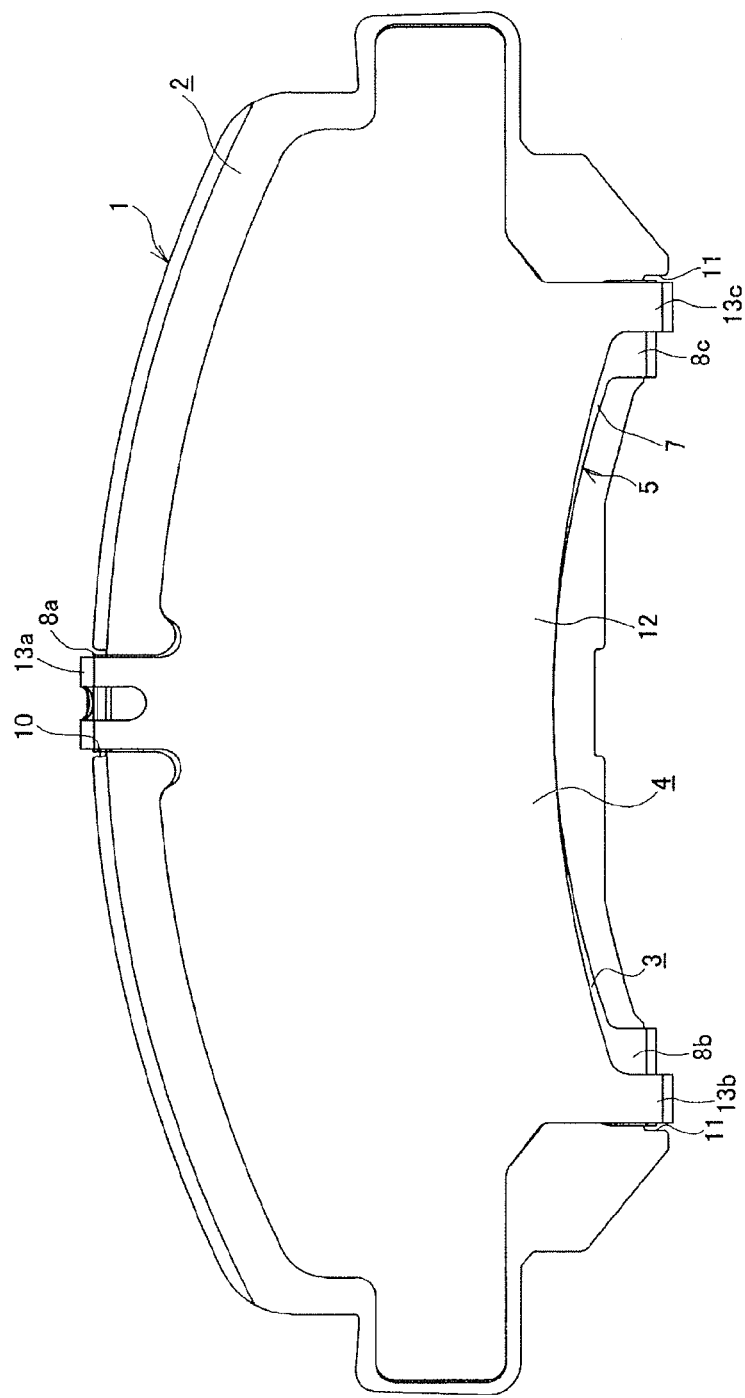
FIG. 15 is a projection drawing of the disc brake pad assembly shown in FIG. 13 as seen from the back surface side of the pad in such a state that the disc brake pad assembly is assembled.

As has been described above, in the disc brake pad assembly 14 of this embodiment, the inner and outer locking pieces 8d, 8e, 8f, 13d, 13e, 13f which are formed on the inner and outer shim plates 3a, 4a, respectively, are brought into direct abutment with the circumferential edge portion of the pressure plate 2a. The separation of the shim plates 3a, 4a is prevented by the engagement between the locking through holes 16, 16 and the locking projecting pieces 19, 19 which are provided in and at the circumferential end portions of the shim plates 3a, 4a, respectively. Thus, the construction adopted by the disc brake pad assembly having the conventional construction which is shown in FIGS. 13 to 15 in which the pluralities of locking pieces 8a, 8b, 8c, 13a, 13b, 13c are fittingly superposed on each other is not adopted. Consequently, compared with the conventional construction, the projection of the locking pieces 8d, 8e, 8f, 13d, 13e, 13f from the circumferential edges of the pressure plate 2a is suppressed to a lower level. Because of this, irrespective of the construction of the disc brake (whether the disc brake is of the floating caliper type or the opposed-piston fixed caliper type, and further, irrespective of the number of pistons), the disc brake pad assembly 14 is made difficult to interfere with the other constituent components of the disc brake, thereby making it possible to enhance the degree of freedom in designing a high-performance disc brake.

Moreover, in the case of the disc brake pad assembly 14 of this embodiment, inner surfaces at circumferential end portions of the front half portions of the outer locking pieces 13d, 13e, 13f which are provided on the outer shim plate 4a which is displaced circumferentially relative to the pressure plate 2a in association with the brakes being applied and released and the circumferential edge portions of the pressure plate 2a are separated from each other. Consequently, circumferential end edges of the outer locking pieces 13d, 13e, 13f are prevented from biting into the circumferential edge portions of the pressure plate 2a, whereby the outer shim plate 4a is allowed to be displaced smoothly in the circumferential direction relative to the pressure plate 2a.

Here, the characteristics of the embodiments of the disc brake pad assemblies according to the invention will be summarized briefly and itemized in paragraphs i to v below.

[i] The disc brake pad assembly 14 comprising:

the pad 1 which includes the lining 6 additionally attached to the front surface of the pressure plate 2a and which is disposed at the portion facing the axial side surface of the rotor;

the inner shim plate 3a which has the flat plate-shaped inner main body portion 7a additionally provided on the back surface of the pressure plate 2a included in the pad 1; and the outer shim plate 4a which has the flat plate-shaped outer main body portion 12a superposed on the inner main body portion 7a of the inner shim plate 3a, wherein the disc brake pad assembly 14 comprises:

the pair of locking bent portions 15 which are formed at the circumferential end portions of the inner shim plate 3a by being bent from the inner main body portion 7a towards the opposite side to the pressure plate 2a;

the locking through holes 16 which are formed individually in the widthwise central portions at the base end portions of the locking bent portions 15; and the pair of locking projecting pieces 19 which are individually formed so as to project circumferentially from the radial middle portions of the circumferential end edges of the outer main body portion 12a included in the outer shim plate 4a, wherein the distance between the distal edges of the locking projecting pieces 19 is larger than the space between the locking bent portions 15 and the circumferential length defined between the radial side portions of the locking projecting pieces 19 on the circumferential end edges of the outer main body portion 12a is shorter than the space between the locking bent portions 15, and wherein the inner main body portion 7a and the outer main body portion 12a are superposed on each other in a state that the locking projecting pieces 19 are brought into engagement with the locking through holes 16.

[ii] The disc brake pad assembly 14 according to [i] above, wherein a guide inclined portion 17 is formed at a portion of at least one of the locking bent portions 15 which lies close to the distal end of the locking bent portions 15, the guide inclined portion 17 being inclined in a direction in which the guide inclined portion 17 is separated away from the other locking bent portion 15 as the guide inclined portion 17 extends towards a distal edge thereof, and wherein, in such a state that the outer main body portion 12a is placed close to the inner main body portion 7a while the locking projecting piece 19 which is one of the locking pieces 19 is brought into engagement with one of the locking through holes 16 at one of the circumferential end edges of the outer main body portion 12a of the outer shim plate 4a, the distal edge of the other of the locking projecting pieces 19 is brought into abutment with the guide inclined portion 17.

[iii] The disc brake pad assembly 14 according to [i] or [ii] above, wherein the inner locking pieces 8d, 8e, 8f which are formed so as to be bent towards the pressure plate 2a at the three or more locations which are distributed to both the circumferential edges of the inward circumferential edge and the outward circumferential edge of the inner main body portion 7a of the inner shim plate 3a are brought into elastic abutment with both the inward and outward circumferential edges of the pressure plate 2a, so that the inner shim plate 3a is additionally provided on the back surface of the pressure plate 2a in such a state that the inner shim plate 3a is restricted from being displaced radially and circumferentially, and wherein the outer locking pieces 13d, 13e, 13f which are formed so as to be bent towards the pressure plate 2a at the three or more locations which are distributed to both the circumferential edges of the inward circumferential edge and the outward circumferential edge of the outer main body portion 12a of the outer shim plate 4a are brought into abutment with the portions on both the inward and outward circumferential edges of the pressure plate 2a which are displaced circumferentially from the portions where the inner locking pieces 8d, 8e, 8f are provided, so that the outer shim plate 4a is fittingly superposed on the back surface of the inner shim plate 3a in such a state that the outer shim plate 4a is restricted from being displaced radially but is permitted to be displaced circumferentially.

[iv] The disc brake pad assembly 14 according to [iii] above, wherein the projecting portions 20a, 20b are formed at the portions on the circumferential edge portions of the pressure plate 2a which are brought into abutment with the one surface of each of the outer locking pieces 13d, 13e, 13f, the circumferential central portion of the portion of the projecting portions 20a, 20b which faces the one surface projects further radially than the circumferential end portions thereof, and wherein the circumferential edge portions of the pressure plate 2a and the one surface of each of the outer locking pieces 13d, 13e, 13f are spaced apart from each other at the portions of the one surface which lie close to the circumferential ends thereof.

[v] The disc brake pad assembly 14 according to [iv] above, wherein the locking recess portion 10a is formed in the circumferential edge portion of the pressure plate 2a, the locking recess portion 10a being concave further radially than both the side portions which lie adjacent circumferentially thereto and having the circumferential widthwise dimension which is larger than the circumferential widthwise dimension of the outer locking pieces, and wherein the projecting portion 20a is formed at the portion on the circumferential edge portion of the pressure plate 2a which corresponds to the bottom portion of the locking recess portion 10a.

While the invention has been described in detail and by reference to the specific embodiment, it is obvious to those skilled in the art to which the invention pertains that various alterations or modifications can be made thereto without departing from the spirit and scope of the invention. This patent application is based on Japanese Patent Application (No. 2011-199675) filed on Sep. 13, 2011, the contents of which are incorporated herein by reference.

Industrial Applicability

The number of shim plates which make up the disc brake pad assembly of the invention is not limited to two. The invention can also be applied to a construction in which a third shim plate (for example, a middle shim plate) is sandwiched between a pressure plate and an inner plate or between the inner shim plate and an outer shim plate.

Additionally, the guide inclined portion at the distal end portion of the locking bent portion does not necessarily have to be provided at both the locking bent portions to facilitate the assemblage of the inner shim plate and the outer shim plate. Only either of the guide inclined portions functions during the assemblage, and hence, the guide inclined portion may be provided only on either of the guide inclined portions. However, as in the illustrated embodiment, in case the guide inclined portions 17, 17 are provided individually on both the locking bent portions 15, 15, there is imposed no limitation on the assembling direction, thereby making it possible to facilitate the assembling work.

Reference Signs List 1 pad
2, 2a pressure plate
3, 3a inner shim plate
4, 4a outer shim plate
5 combined shim plate
6 lining
7, 7a inner main body portion
8a, 8b, 8c, 8d, 8e, 8f inner locking piece
9 through hole
10, 10a locking recess portion
11 step portion
12, 12a outer main body portion
13a, 13b, 13c, 13d, 13e, 13f outer locking piece
14 disc brake pad assembly
15 locking bent portion
17 guide inclined portion
18 radially inward locking recess portion 18
19 locking projecting piece
20a, 20b projecting portion

The invention claimed is:

1. A disc brake pad assembly comprising:
a pad which includes a lining additionally attached to a front surface of a pressure plate and which is disposed at a portion facing an axial side surface of a rotor;
an inner shim plate which has a flat plate-shaped inner main body portion additionally provided on a back surface of the pressure plate included in the pad; and
an outer shim plate which has a flat plate-shaped outer main body portion superposed on the inner main body portion of the inner shim plate,
wherein the disc brake pad assembly comprises:
a pair of locking bent portions which are formed at circumferential end portions of the inner shim plate by being bent from the inner main body portion towards an opposite side to the pressure plate;
locking through holes which are formed individually in widthwise central portions at base end portions of the locking bent portions; and
a pair of locking projecting pieces which are individually formed so as to project circumferentially from radial middle portions of circumferential end edges of the outer main body portion included in the outer shim plate,
wherein a distance between distal edges of the locking projecting pieces is larger than a space between the locking bent portions, and a circumferential length defined between radial side portions of the locking projecting pieces on the circumferential end edges of the outer main body portion is shorter than the space between the locking bent portions, and
wherein the inner main body portion and the outer main body portion are superposed on each other in a state that the locking projecting pieces are brought into engagement with the locking through holes.

2. The disc brake pad assembly according to claim 1,
wherein a guide inclined portion is formed at a portion of at least one of the locking bent portions which lies close to a distal end of the locking bent portions, the guide inclined portion being inclined in a direction in which the guide inclined portion is separated away from the other locking bent portion as the guide inclined portion extends towards a distal edge thereof, and
wherein, in a state that the outer main body portion is placed close to the inner main body portion while one of the locking projecting pieces is brought into engagement with one of the locking through holes at one of circumferential end edges of the outer main body portion of the outer shim plate, a distal edge of the other of the locking projecting pieces is brought into abutment with the guide inclined portion.

3. The disc brake pad assembly according to claim 1,
wherein inner locking pieces which are formed so as to be bent towards the pressure plate at three or more locations which are distributed to both circumferential edges of an inward circumferential edge and an outward circumferential edge of the inner main body portion of the inner shim plate are brought into elastic abutment with both inward and outward circumferential edges of the pressure plate, so that the inner shim plate is additionally provided on a back surface of the pressure plate in a state that the inner shim plate is restricted from being displaced radially and circumferentially, and
wherein outer locking pieces which are formed so as to be bent towards the pressure plate at three or more locations which are distributed to both circumferential edges of an inward circumferential edge and an outward circumferential edge of the outer main body portion of the outer shim plate are brought into abutment with portions on both the inward and outward circumferential edges of the pressure plate which are displaced circumferentially from the portions where the inner locking pieces are provided, so that the outer shim plate is superposed on a back surface of the inner shim plate in a state that the outer shim plate is restricted from being displaced radially but is permitted to be displaced circumferentially.

4. The disc brake pad assembly according to claim 3,
wherein projecting portions are formed at portions on the circumferential edge portions of the pressure plate which are brought into abutment with one surface of each of the outer locking pieces, and a circumferential central portion of a portion of each of the projecting portions which faces the one surface projects further radially than circumferential end portions thereof, and
wherein the circumferential edge portions of the pressure plate and the one surface of each of the outer locking pieces are spaced apart from each other at portions of the one surface which lie close to circumferential ends thereof.

5. The disc brake pad assembly according to claim 4,
wherein a locking recess portion is formed in a circumferential edge portion of the pressure plate, the locking recess portion being concave further radially than both side portions which lie adjacent circumferentially thereto and having a circumferential widthwise dimension which is larger than a circumferential widthwise dimension of the outer locking pieces, and
wherein the projecting portion is formed at a portion on the circumferential edge portion of the pressure plate which corresponds to a bottom portion of the locking recess portion.

* * * * *